US011383587B2

(12) United States Patent
    Haraguchi

(10) Patent No.: US 11,383,587 B2
(45) Date of Patent: Jul. 12, 2022

(54) VEHICLE SUN VISOR

(71) Applicant: KYOWA SANGYO CO., LTD., Toyota (JP)

(72) Inventor: Takashi Haraguchi, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 0 days.

(21) Appl. No.: 17/262,777

(22) PCT Filed: Oct. 17, 2019

(86) PCT No.: PCT/JP2019/040839
§ 371 (c)(1),
(2) Date: Jan. 25, 2021

(87) PCT Pub. No.: WO2020/085181
PCT Pub. Date: Apr. 30, 2020

(65) Prior Publication Data
US 2021/0268879 A1    Sep. 2, 2021

(30) Foreign Application Priority Data

Oct. 26, 2018  (JP) .............................. JP2018-201611

(51) Int. Cl.
    *B60J 3/02*    (2006.01)
(52) U.S. Cl.
    CPC ..................................... *B60J 3/023* (2013.01)
(58) Field of Classification Search
    CPC .............................. B60J 3/023; B60J 3/0213
    USPC ....................................................... 296/97.9
    See application file for complete search history.

(56) References Cited

U.S. PATENT DOCUMENTS 5,169,203 A * 12/1992 Lawassani ............... B60J 3/023
                                                            296/97.1
7,111,890 B2    9/2006 Delus et al.

FOREIGN PATENT DOCUMENTS

| JP | 2005-059798 A | | 3/2005 | |
| KR | 2002003911 A | * | 1/2002 | ............ B60J 3/0213 |
| WO | 83/00846 A1 | | 3/1983 | |
| WO | 92/21528 A1 | | 12/1992 | |

OTHER PUBLICATIONS

Chun et al., Translation of Description of "Structure for Mounting a Sun Visor of Vehicle", Jan. 2002 (Year: 2002).*

* cited by examiner

*Primary Examiner* — Joseph D. Pape
*Assistant Examiner* — Veronica Marie Shull
(74) *Attorney, Agent, or Firm* — Oliff PLC

(57) ABSTRACT

A vehicle sun visor having a visor main body with a recess; a shaft located in the recess; and first and second mounting parts. The first mounting part has an inlet through which a first shaft end is inserted; an inlet protrusion; an inlet recess; a deep-side protrusion that extends from the inlet recess toward a deep side and protrudes toward the first shaft end; a deep-side flat part that extends farther toward the deep side than the inlet protrusion; and a first stopper that is located at a position farther on the deep side than the deep-side protrusion. The second mounting part has an inlet through which a second shaft end is inserted; a first inlet protrusion that protrudes at the inlet toward the second shaft end; a second inlet protrusion; and a second stopper that is located farther on a deep side than the second inlet protrusion.

4 Claims, 10 Drawing Sheets

VEHICLE SUN VISOR

TECHNICAL FIELD

The present invention relates to a vehicle sun visor that is movably attached to a ceiling or the like of a vehicle.

BACKGROUND ART

The vehicle sun visor disclosed in Patent Literature 1 has a plate-shaped visor main body and a rod-shaped engaging piece (30) that is installed in a recess (7) of the visor main body. The visor main body is rotatably mounted on a ceiling of a vehicle so as to be movable to a front position in which it covers an upper region of the windshield and a side position in which it covers an upper region of a front door glass. When the visor main body is located in the front position, the engaging piece (30) is held so as to be removable from a hook that is provided on an upper side of the windshield.

The recess (7) is formed at an upper edge of the visor main body, and support parts (5) that support the engaging piece (30) are provided one at each shoulder of the recess (7). Each support part (5) has an engaging piece receiving opening (5a) facing the other support part (5). To mount the engaging piece (30) onto the visor main body, engaging legs (31) formed at one end of the engaging piece (30) are inserted into the engaging piece receiving opening (5a) while being elastically deformed. Then, engaging legs (31) formed at the other end of the engaging piece (30) are inserted into the other engaging piece receiving opening (5a). As protrusions (32) formed at both ends of the engaging piece (30) get caught on the support parts (5), the engaging piece (30) is mounted onto the visor main body.

CITATION LIST

Patent Literature

Patent Literature 1: Japanese Patent Application Publication No. 2005-59798

SUMMARY OF THE INVENTION

In the sun visor of Patent Literature 1, since the engaging piece (30) is inserted into the visor main body while being elastically deformed, it is not easy to mount the engaging piece (30) onto the visor main body. In addition, as the engaging piece (30) is mounted onto the visor main body while being significantly deformed, the engaging piece (30) may undergo plastic deformation or deformation over time. As a result, the engaging piece (30) may rattle relatively to the visor main body. Thus, there has been need for a vehicle sun visor having a structure or the like that allows an engaging piece (shaft) to be easily inserted into a visor main body.

According to one feature of this disclosure, a vehicle sun visor includes a visor main body having a plate shape and having a recess formed at one edge and a shaft located in the recess. This vehicle sun visor further includes a first mounting part of the visor main body into which a first shaft end of the shaft is inserted, and a second mounting part of the visor main body into which a second shaft end of the shaft is inserted. The first mounting part has an inlet through which the first shaft end is inserted, and an inlet protrusion that protrudes at the inlet toward the first shaft end. The first mounting part further has an inlet recess that is located at the inlet at a position that is radially opposite to the inlet protrusion, the inlet recess being separated from the first shaft end, and a deep-side protrusion that extends from the inlet recess toward a deep side along the first shaft end and protrudes toward the first shaft end. The first mounting part further has a deep-side flat part that is located at a position that is radially opposite to the deep-side protrusion and extends farther toward the deep side than the inlet protrusion, and a first stopper that is located at a position farther on the deep side than the deep-side protrusion and protrudes from the visor main body so as to face a leading end, in a longitudinal axis direction, of the first shaft end. The second mounting part has an inlet through which the second shaft end is inserted, and a first inlet protrusion that protrudes at the inlet toward the second shaft end. The second mounting part further has a second inlet protrusion that protrudes at the inlet from a position that is radially opposite to the first inlet protrusion toward the second shaft end, and a second stopper that is located at a position farther on a deep side than the second inlet protrusion and protrudes from the visor main body so as to face a leading end, in a longitudinal axis direction, of the second shaft end.

Thus, the inlet recess is formed in the first mounting part, which allows the first shaft end to be obliquely inserted into the first mounting part. Specifically, the first shaft end can be inserted from the side of the inlet recess toward the deep-side flat part located on the deep side of the inlet protrusion. Therefore, the first shaft end can be inserted into the first mounting part, for example, without the first shaft end and the first mounting part being deformed. After the first shaft end is obliquely inserted into the first mounting part, the first shaft end is held parallel to the first mounting part. Thus, the first shaft end is supported by the inlet protrusion and the deep-side protrusion from both sides in the radial direction. Then, the shaft is slid in the longitudinal direction to insert the second shaft end into the second mounting part. Thus, the second shaft end is supported by the first inlet protrusion and the second inlet protrusion from both sides in the radial direction. Movement of the shaft in the longitudinal direction is restricted by the first stopper and the second stopper. Therefore, when the shaft is mounted onto the visor main body, the shaft is less likely to move farther into the visor main body than it is supposed to. Thus, the shaft can be reliably mounted onto the visor main body.

According to another feature of this disclosure, the first mounting part has an inlet opening diameter that is determined by the inlet recess and the inlet protrusion, and a deep-side opening diameter that is determined by the deep-side protrusion and the deep-side flat part. Further, the inlet opening diameter and the deep-side opening diameter are large enough to allow the first shaft end to be obliquely inserted into the first mounting part, from a side of the inlet recess toward the deep-side flat part, without the first mounting part and the first shaft end being elastically deformed. This means that there is no structure in the insertion path for the first shaft end.

Thus, obliquely inserting the first shaft end into the first mounting part does not require the force to elastically deform the first mounting part or the first shaft end. Therefore, the first shaft end can be inserted into the first mounting part with a small force. If the first mounting part or the first shaft end is significantly elastically deformed, the first mounting part or the first shaft end will undergo plastic deformation or become prone to deformation over time. The above-described feature can reduce the likelihood of this phenomenon. As a result, the likelihood that the shaft may rattle relatively to the visor main body due to plastic deformation of the first mounting part or the first shaft end can be reduced. Moreover, the durability of the visor main body and the shaft can be enhanced.

According to another feature of this disclosure, the shaft has such a length in a longitudinal direction that the second shaft end is detached from the second mounting part in the longitudinal axis direction when the shaft is located in a first limit position in which the shaft contacts the first stopper. Further, the inlet recess of the first mounting part is formed such that the shaft tilts around the first mounting part in the first limit position and that the second shaft end is detached from the second mounting part in a radial direction orthogonal to the longitudinal axis direction.

Thus, when the first shaft end is inserted into the first mounting part, the first shaft end can be obliquely inserted into the first mounting part, without being interfered with by the second mounting part. Then, the shaft can be held parallel to the first mounting part while the first shaft end is inserted toward the deep side of the first mounting part. Thereafter, sliding the shaft in the longitudinal direction can insert the second shaft end into the second mounting part. In this way, the shaft can be easily mounted onto the visor main body.

According to another feature of this disclosure, the shaft is slidable in the longitudinal axis direction between a first limit position in which the shaft contacts the first stopper and a second limit position in which the shaft contacts the second stopper. Further, the deep-side protrusion of the first mounting part has such a length in the longitudinal axis direction that the deep-side protrusion contacts the first shaft end so as to support the first shaft end at any position between the first limit position in which the shaft contacts the first stopper and the second limit position in which the shaft contacts the second stopper.

Thus, the deep-side protrusion of the first mounting part supports the first shaft end, so that the shaft can be slid without tilting relatively to the first mounting part. Therefore, the shaft can be easily mounted onto the visor main body.

MODES FOR CARRYING OUT THE INVENTION

Figure 1:
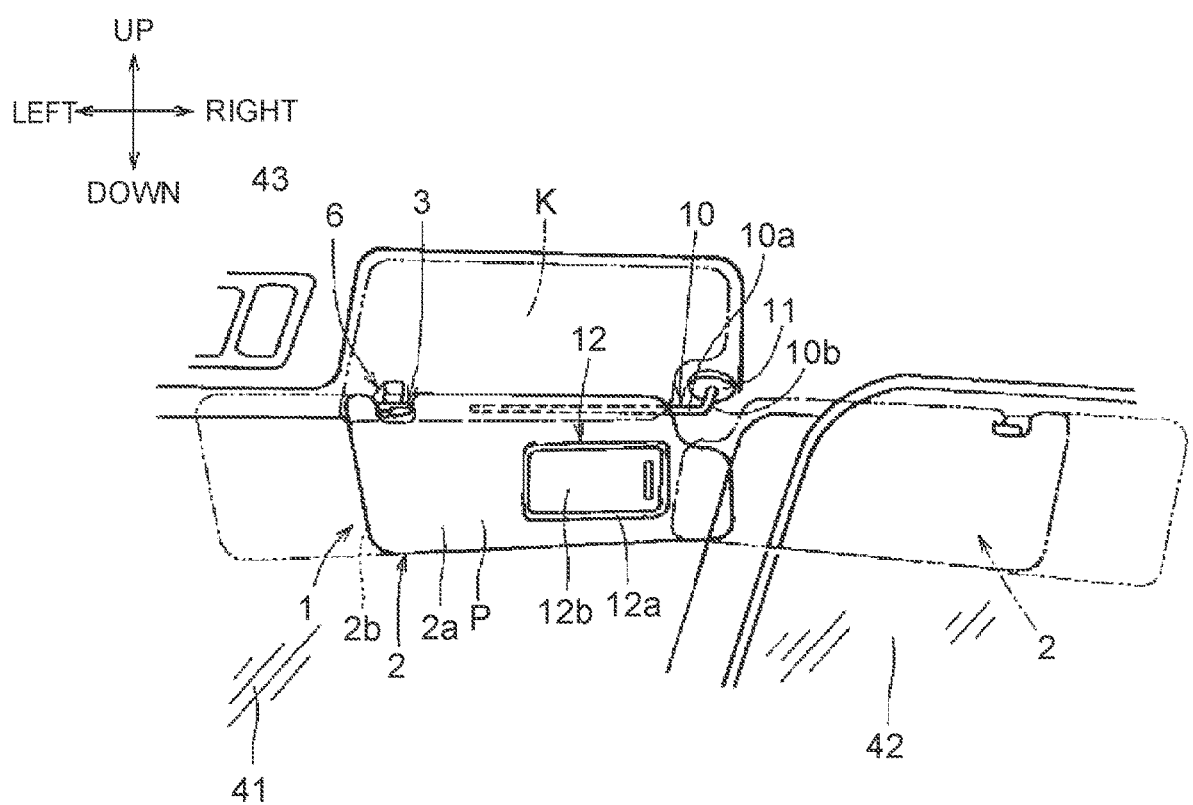
FIG. 1 is a perspective view of part of an inside of a vehicle and a sun visor mounted on the vehicle.

One embodiment of the present invention will be described using the drawings. As shown in FIG. 1, a vehicle sun visor 1 includes a visor main body 2, a mirror unit 12, and a support shaft 10. The mirror unit 12 has a rectangular mirror frame 12a mounted on the visor main body 2, and a mirror plate (not shown) mounted on the mirror frame 12a. A mirror lid 12b is mounted on the mirror frame 12a so as to be slidable to a closing position in which the mirror lid 12b covers the mirror plate and an opening position in which it opens the mirror plate. The vehicle sun visor 1 is attached to a ceiling surface 43 near a windshield 41 inside a vehicle cabin.

As shown in FIG. 1, the vehicle sun visor 1 includes the support shaft 10 that is attached to the visor main body 2. The support shaft 10 is a substantially L-shaped rod, and has a horizontal shaft 10a that extends sideways from the visor main body 2 and a vertical shaft 10b that extends upward from a leading end of the horizontal shaft 10a. A bracket 11 attached at a leading end of the vertical shaft 10b is mounted on the ceiling surface 43 of the vehicle cabin. By rotating around the horizontal shaft 10a, the visor main body 2 rotates between a retracted position K in which it lies along the ceiling surface 43 and a deployed position P in which it lies along the windshield 41. Further, by rotating around the vertical shaft 10b, the visor main body 2 moves to a side position in which it lies along a door window 42.

Figure 2:
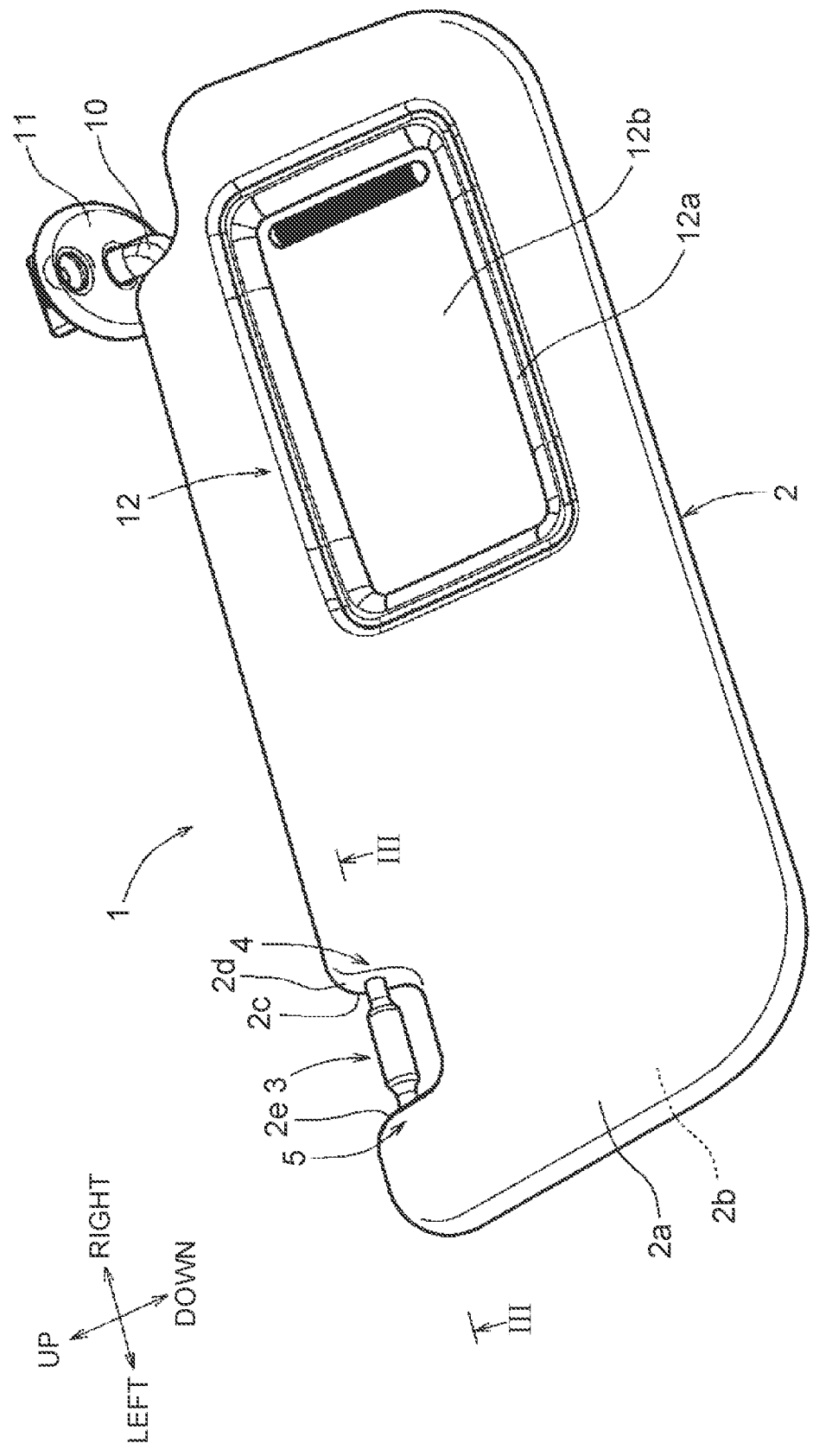
FIG. 2 is a perspective view of the sun visor.
Figure 3:
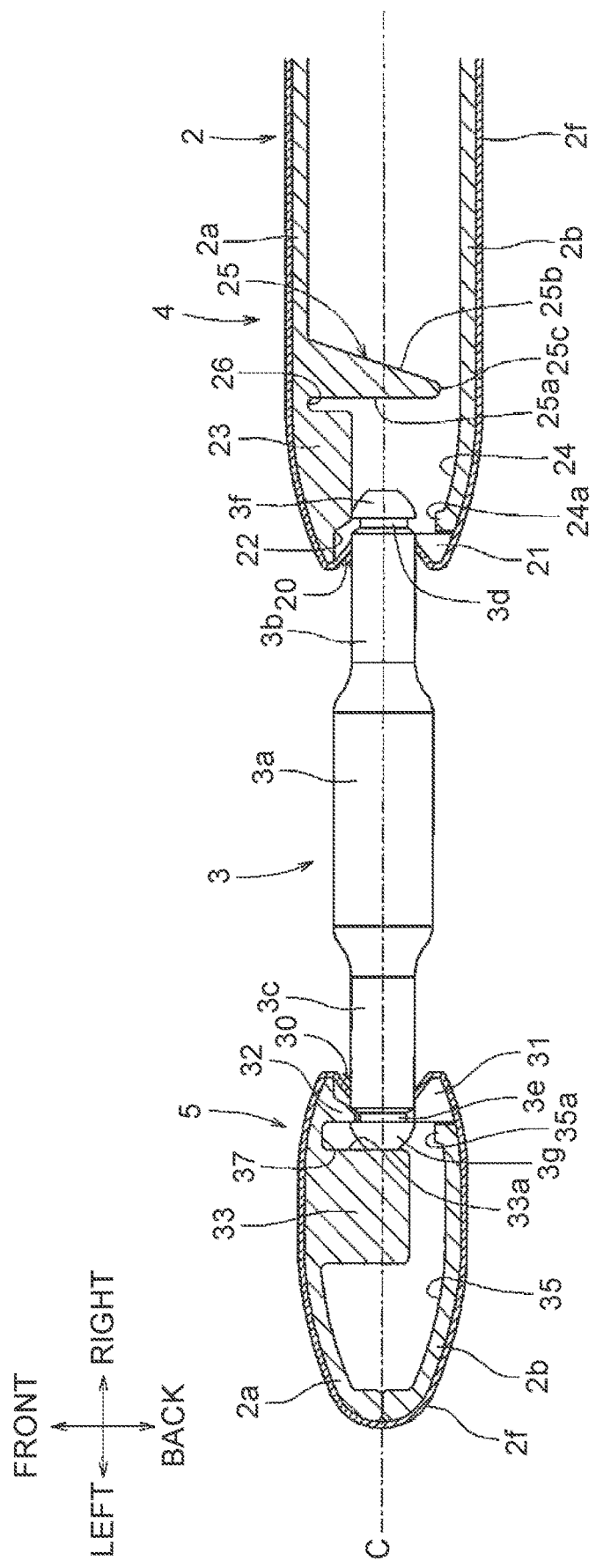
FIG. 3 is a view of section along in FIG. 2 as seen from the arrow direction.

As shown in FIG. 1, the vehicle sun visor 1 has a shaft 3. The shaft 3 is removably held by a hook 6 that is fixed to the ceiling surface 43. When the shaft 3 is mounted on the hook 6, the visor main body 2 rotates around the shaft 3 and the horizontal shaft 10a between the deployed position P and the retracted position K. When the shaft 3 is removed from the hook 6, the visor main body 2 can be rotated from the deployed position P to the side position. As shown in FIG. 1 and FIG. 2, the shaft 3 is provided on the visor main body 2, in a position coaxial with the horizontal shaft 10a. The visor main body 2 has a recess 2c formed at an upper edge, and the shaft 3 is installed in the recess 2c. As shown in FIG. 3, the shaft 3 has a first shaft end 3b that is inserted into a first mounting part 4 of the visor main body 2 and a second shaft end 3c that is inserted into a second mounting part 5 of the visor main body 2.

Figure 4:
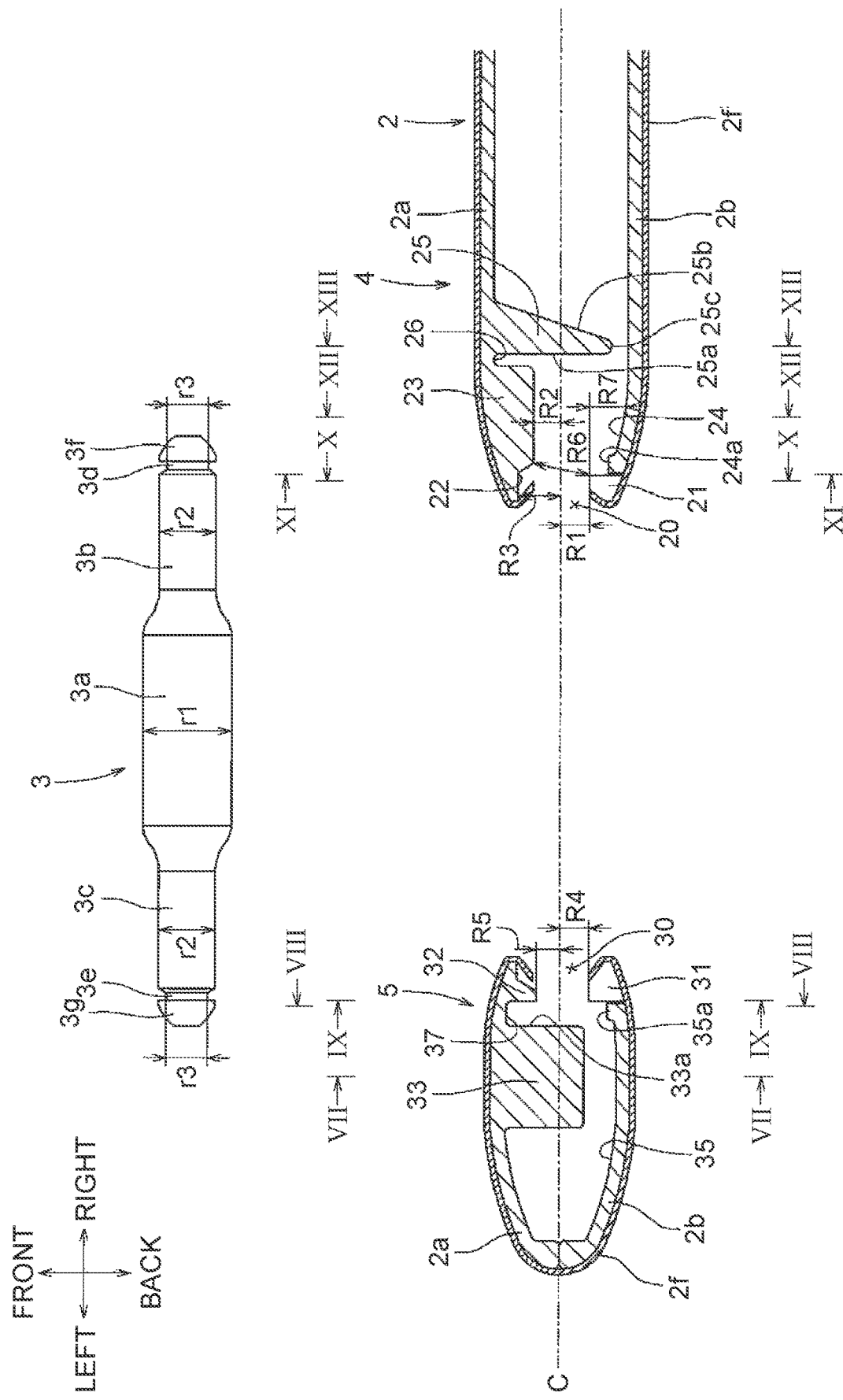
FIG. 4 is a front view of a shaft and a sectional view of a first mounting part and a second mounting part.

As shown in FIG. 4, the shaft 3 has, at the center, a large-diameter part 3a with a diameter r1. The first shaft end 3b and the second shaft end 3c, each of which has a diameter r2 that is smaller than the diameter of the large-diameter part 3a, are respectively provided at both ends of the large-diameter part 3a. A tapered transition portion is formed between the large-diameter part 3a and each of the shaft ends 3b, 3c. The shaft ends 3b, 3c have an annular first groove 3d and an annular second groove 3e, respectively, near leading ends thereof. The diameter of the shaft 3 corresponding to the first groove 3d and the second groove 3e is a diameter r3 that is smaller than the diameter r2. The shaft ends 3b, 3c have terminal portions 3f, 3g of a convex shape farther on a leading end side than the grooves 3d, 3e.

Figure 7:
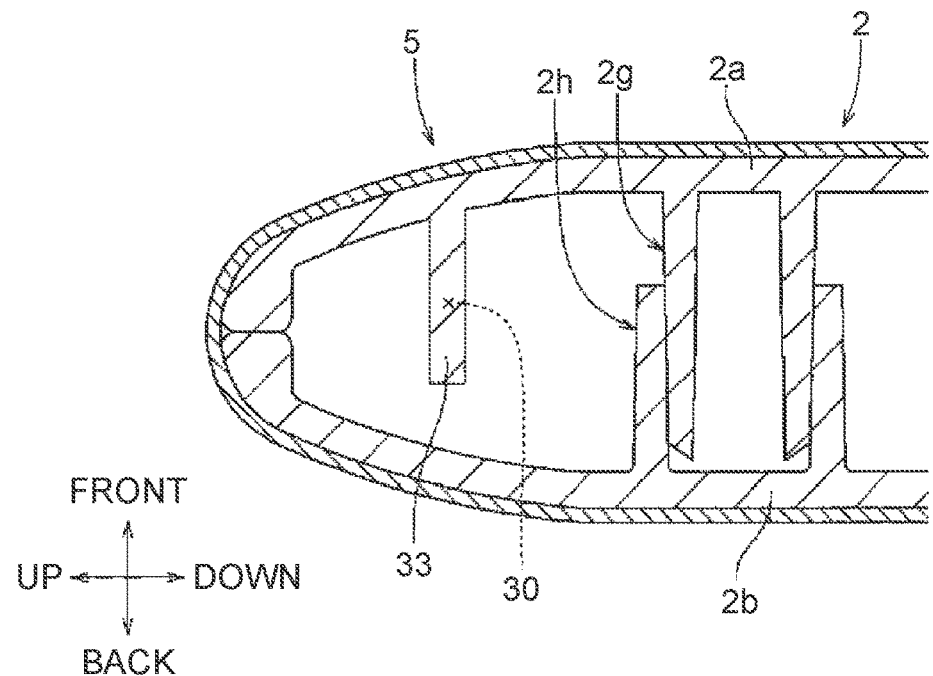
FIG. 7 is a view of section along VII-VII in FIG. 4 as seen from the arrow direction.

As shown in FIG. 3, the visor main body 2 has a hollow plate shape and includes a first shell 2a and a second shell 2b that are placed one on top of the other in a thickness direction. A surface of the visor main body 2 is covered with a skin 2f. As shown in FIG. 7, the first shell 2a and the second shell 2b are coupled to each other as a plurality of mounting parts 2g protruding from an inner surface of the first shell 2a and a plurality of mounting parts 2h protruding from an inner surface of the second shell 2b are fitted with each other. For example, the mounting parts 2g and the mounting parts 2h have a cylindrical shape and the mounting parts 2g are inserted into the mounting parts 2h. As shown in FIG. 2, the visor main body 2 has the recess 2c at one edge (upper edge). The recess 2c is formed on a left side of the upper edge of the visor main body 2 and recessed toward a lower edge. The second mounting part 5 is provided in a left side surface of the recess 2c and the first mounting part 4 is provided in a right side surface thereof.

As shown in FIG. 3, the first mounting part 4 is configured such that the first shaft end 3b is inserted between the first shell 2a and the second shell 2b. The first mounting part 4 has an inlet 20, and an inlet protrusion 21 and an inlet recess 22 that are located near the inlet 20. The first mounting part 4 has a deep-side protrusion 23 and a deep-side flat part 24 on a deep side, and a deep-side recess 26 and a first stopper 25 farther on the deep side.

Figure 10:
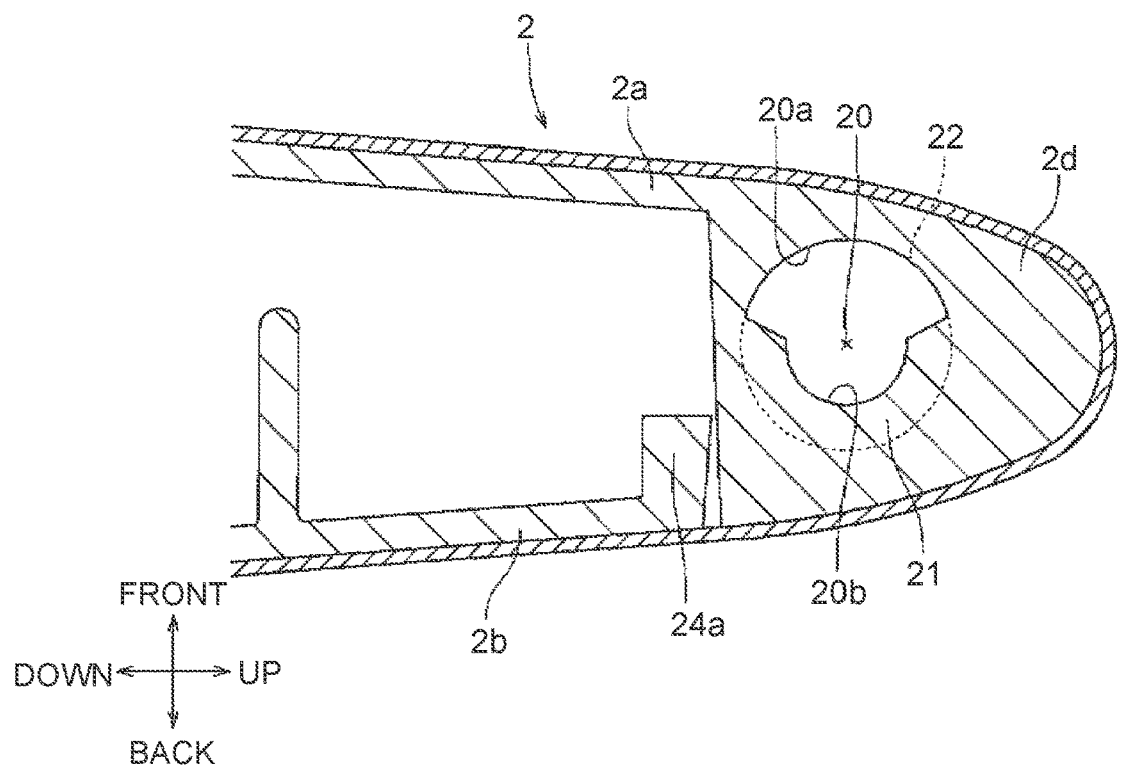
FIG. 10 is a view of section along X-X in FIG. 4 as seen from the arrow direction.
Figure 11:
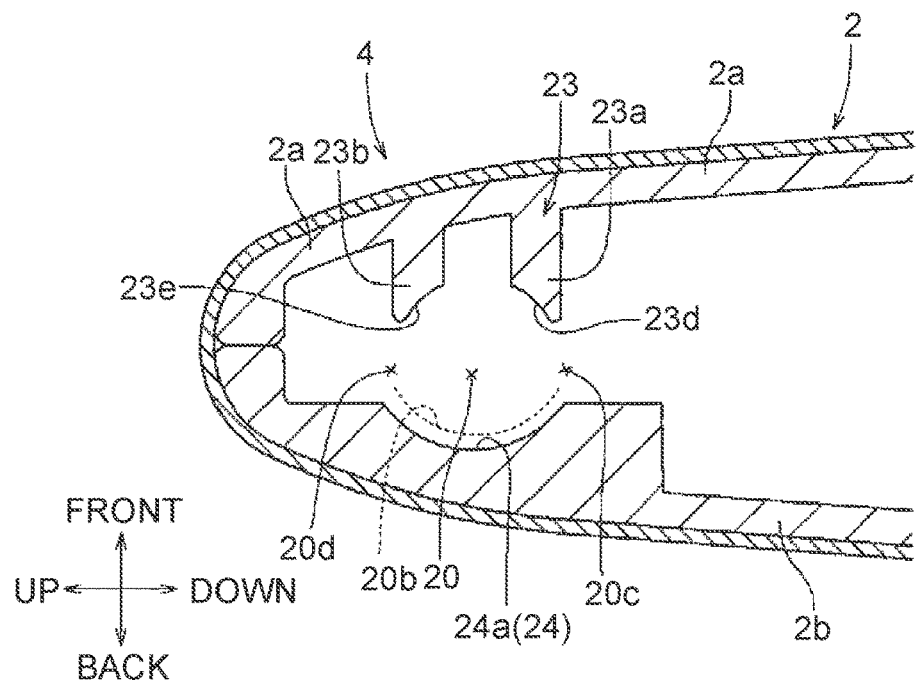
FIG. 11 is a view of section along XI-XI in FIG. 4 as seen from the arrow direction.
Figure 12:
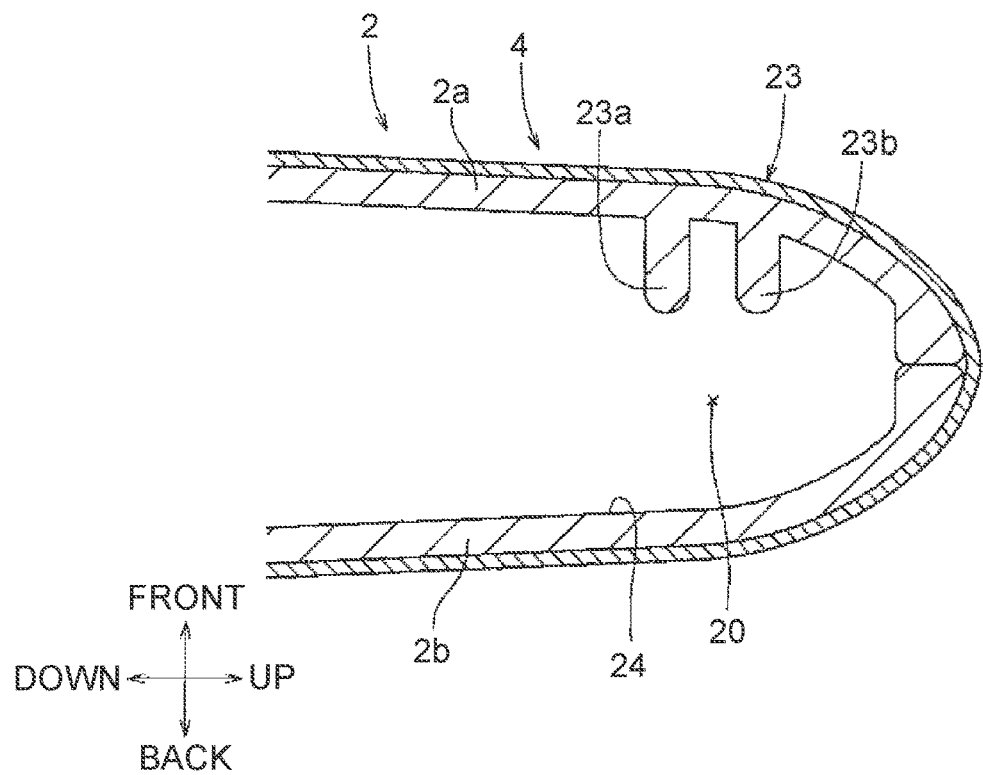
FIG. 12 is a view of section along XII-XII in FIG. 4 as seen from the arrow direction.

As shown in FIG. 3 and FIG. 10, the inlet 20 is formed in a lid 2d that is formed in the first shell 2a. The lid 2d extends from the first shell 2a toward the second shell 2b so as to form the right side surface of the recess 2c shown in FIG. 2. The inlet 20 has a first arc 20a and a second arc 20b. The first arc 20a and the second arc 20b each have a substantially semicircular shape. The radius of the first arc 20a is larger than the radius of the second arc 20b. Therefore, the first shaft end 3b can be easily obliquely inserted into the inlet 20 from the side of the first arc 20a.

As shown in FIG. 3, FIG. 4, and FIG. 10, the inlet protrusion 21 protrudes from the side of the second shell 2b toward the side of the first shell 2a. The inlet protrusion 21 protrudes to a position at a distance R1 from the inlet 20 or a central axis C of the shaft 3 inserted in the inlet 20. The inlet protrusion 21 is adjacent to the inlet 20 and has an arc shape conforming to the second arc 20b of the inlet 20. The inlet protrusion 21 supports the first shaft end 3b.

As shown in FIG. 3, FIG. 4, and FIG. 10, the inlet recess 22 is provided in the first shell 2a so as to be recessed at a position that is radially opposite to the inlet protrusion 21. The inlet recess 22 has an arc shape conforming to the first arc 20a of the inlet 20. The arc shape of the inlet recess 22 has a radius R3 from the central axis C. Therefore, the first shaft end 3b can be easily obliquely inserted into the inlet 20 from the inlet recess 22.

As shown in FIG. 3, FIG. 4, FIG. 11, and FIG. 12, the deep-side protrusion 23 has a first deep-side protrusion 23a and a second deep-side protrusion 23b that protrude from the first shell 2a. The deep-side protrusion 23 protrudes to a position at a distance R2 from the central axis C of the shaft 3. R1 and R2 are equal. At leading ends of the deep-side protrusions 23a, 23b, hollowed portions 23d, 23e are formed by hollowing out these protrusions into shapes corresponding to an outer circumferential surface of the shaft 3. The first deep-side protrusion 23a and the second deep-side protrusion 23b face each other with a clearance left therebetween. The first deep-side protrusion 23a and the second deep-side protrusion 23b are adjacent to the inlet recess 22 and located farther on the deep side than the inlet protrusion 21 and extend from the inlet recess 22 toward the deep side. The lengths of the first deep-side protrusion 23a and the second deep-side protrusion 23b in a longitudinal direction are substantially equal to the length of the first shaft end 3b.

Figure 6:
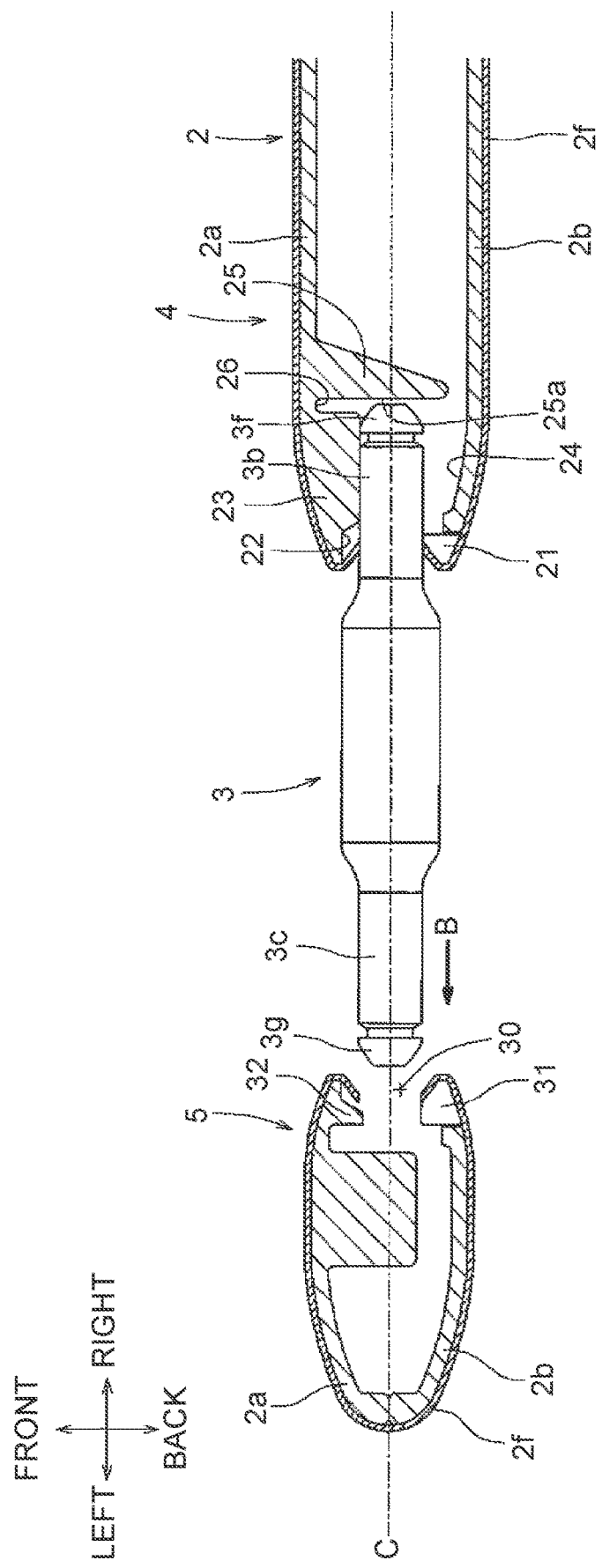
FIG. 6 is a front view of the shaft and a sectional view of the visor main body in a state where the first shaft end is inserted to a deep side of the first mounting part.

As shown in FIG. 6, the deep-side protrusion 23 supports the first shaft end 3b when the shaft 3 is mounted onto the visor main body 2.

Figure 5:
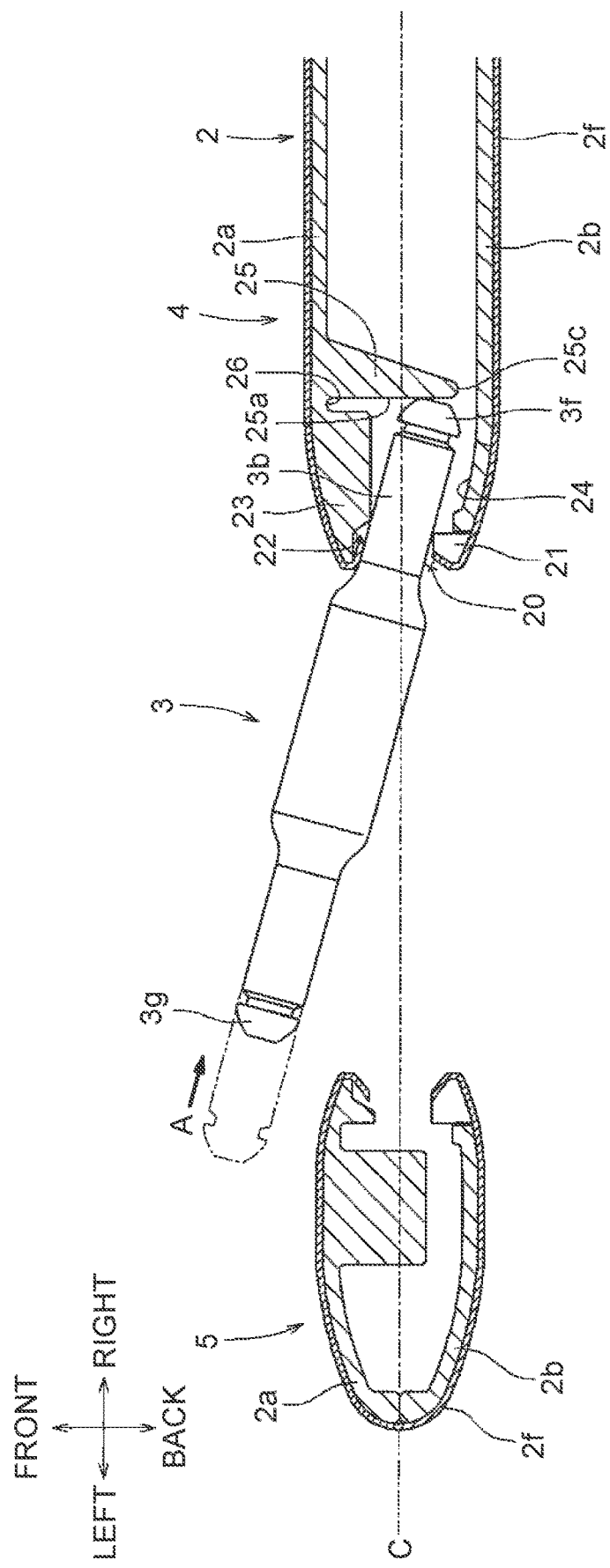
FIG. 5 is a front view of the shaft and a sectional view of a visor main body in a state where a first shaft end is obliquely inserted into the first mounting part of the visor main body.

As shown in FIG. 3 and FIG. 10, the deep-side flat part 24 is located on the deep side of the inlet protrusion 21 and faces the deep-side protrusion 23. The deep-side flat part 24 has a leading-end protrusion 24a that is adjacent to the inlet protrusion 21. The leading-end protrusion 24a is shorter in height than the inlet protrusion 21, and the deep-side flat part 24 is as a whole shorter in height than the inlet protrusion 21. Therefore, the first shaft end 3b can be easily obliquely inserted into the inlet 20 toward the deep-side flat part 24 as shown in FIG. 5.

As shown in FIG. 3, the first stopper 25 is located on the deep side of the deep-side protrusion 23. The first stopper 25 protrudes from the first shell 2a toward the second shell 2b, with such an amount of protrusion that the first stopper 25 can face the first shaft end 3b. The first stopper 25 protrudes preferably beyond the central axis C of the shaft 3. The first stopper 25 has a substantially right-angled triangular prism shape when seen from below, and has a perpendicular surface 25a and an inclined surface 25b. The perpendicular surface 25a extends substantially perpendicularly to an inner peripheral surface of the first shell 2a, and the inclined surface 25b extends obliquely with respect to the inner peripheral surface of the first shell 2a. The first stopper 25 has, at a leading end, a flat surface 25c that couples the perpendicular surface 25a and the inclined surface 25b to each other.

Figure 13:
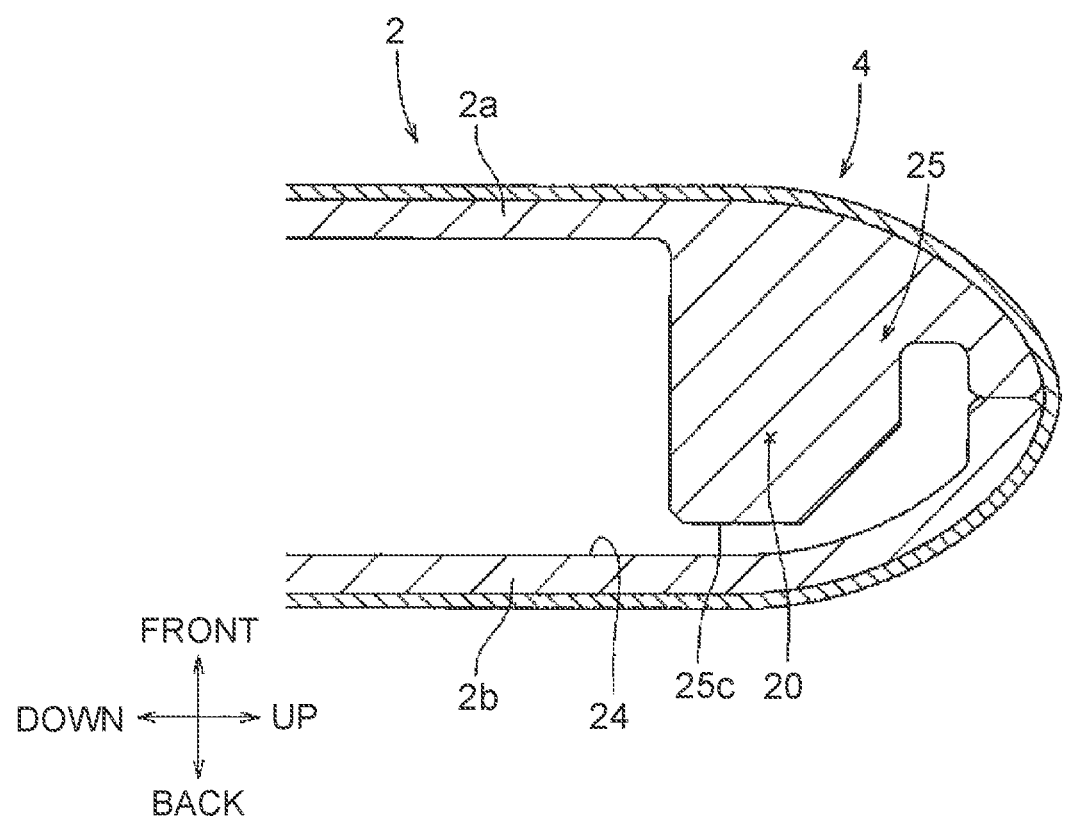
FIG. 13 is a view of section along XIII-XIII in FIG. 4 as seen from the arrow direction.

As shown in FIG. 13, the perpendicular surface 25a has a substantially pentagonal shape when seen from a side. This allows the first stopper 25 to be located close to the second shell 2b, near a part where the first shell 2a and the second shell 2b are coupled to each other. As shown in FIG. 5 and FIG. 6, the first stopper 25 restricts movement of the first shaft end 3b of the shaft 3 in the longitudinal direction when the first shaft end 3b is mounted onto the first mounting part 4. Thus, the first stopper 25 prevents the first shaft end 3b from moving farther into the visor main body 2 than it is supposed to. As shown in FIG. 3, the deep-side recess 26 is provided between the first stopper 25 and the deep-side protrusion 23. This prevents a force exerted on the first stopper 25 from being transmitted to the deep-side protrusion 23.

As shown in FIG. 3, the second mounting part 5 is configured such that the second shaft end 3c is inserted between the first shell 2a and the second shell 2b. The second mounting part 5 has an inlet 30, and a first inlet protrusion 31 and a second inlet protrusion 32 that are located near the inlet 30. The second mounting part 5 further has a second stopper 33 on the deep side of the second inlet protrusion 32, and a deep-side flat part 35 on the deep side of the first inlet protrusion 31.

Figure 9:
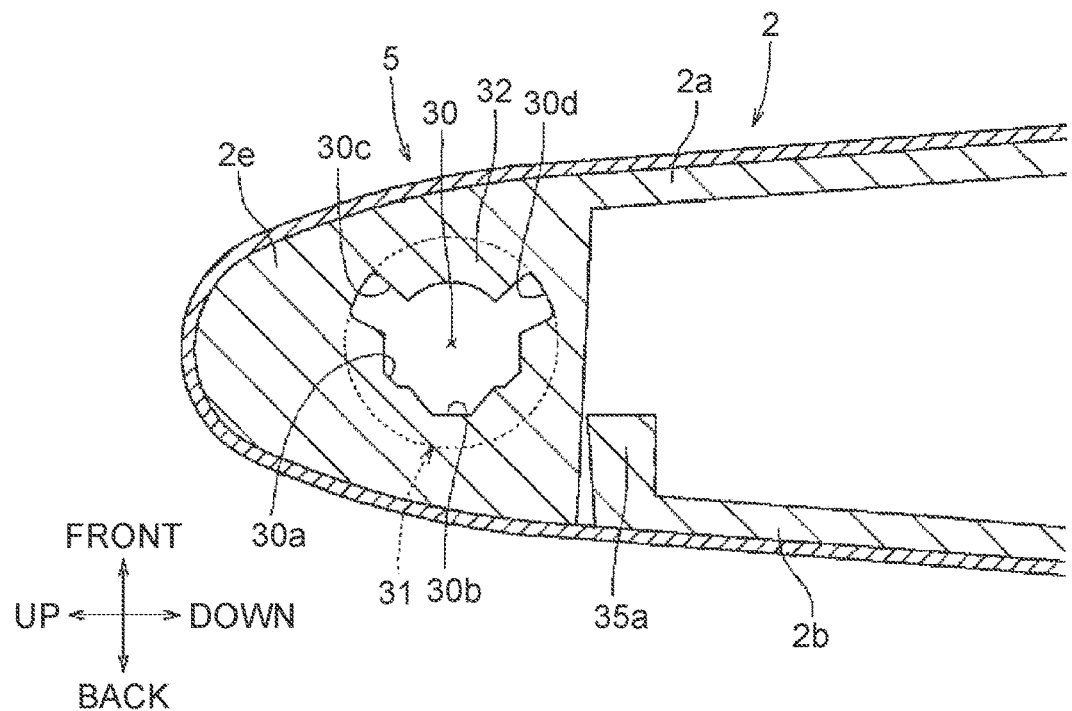
FIG. 9 is a view of section along IX-IX in FIG. 4 as seen from the arrow direction.

As shown in FIG. 3 and FIG. 9, the inlet 30 is formed in a lid 2e that is formed in the first shell 2a. The lid 2e extends from the first shell 2a toward the second shell 2b so as to form the left side surface of the recess 2c shown in FIG. 2. The inlet 30 has a circular center hole 30a and recesses 30b, 30c, 30d that are radially recessed from the center hole 30a. The recesses 30b, 30c, 30d are disposed at substantially equal intervals in a circumferential direction.

As shown in FIG. 3, FIG. 4, and FIG. 9, the first inlet protrusion 31 protrudes from the side of the second shell 2b toward the side of first shell 2a, to a position at a distance R4 from the central axis C of the shaft 3. The first inlet protrusion 31 is adjacent to the inlet 30 and has an arc shape conforming to the center hole 30a of the inlet 30. The first inlet protrusion 31 supports the second shaft end 3c.

As shown in FIG. 3, FIG. 4, and FIG. 9, the second inlet protrusion 32 is located so as to face the first inlet protrusion 31. The second inlet protrusion 32 protrudes from the first shell 2a toward the second shell 2b, to a distance R5 from the central axis C of the shaft 3. R4 and R5 are equal. The second inlet protrusion 32 is adjacent to the inlet 30 and has an arc shape conforming to the center hole 30a of the inlet 30. The second inlet protrusion 32 supports the second shaft end 3c. The second inlet protrusion 32 has a leading end in a tapered shape. As such, the leading end of the second inlet protrusion 32 fits easily into the second groove 3e of the second shaft end 3c. As the leading end of the second inlet protrusion 32 fits into the second groove 3e of the second shaft end 3c, movement of the shaft 3 in the longitudinal direction is restricted.

As shown in FIG. 3, the second stopper 33 is located on the deep side of the second inlet protrusion 32. The second stopper 33 protrudes from the first shell 2a toward the second shell 2b, with such an amount of protrusion that the second stopper 33 can face the second shaft end 3c. The second stopper 33 protrudes preferably beyond the central axis C of the shaft 3. As shown in FIG. 3 and FIG. 7, the second stopper 33 has a substantially plate shape and is elongated in an axial direction of the shaft 3. The second stopper 33 prevents the second shaft end 3c of the shaft 3 from moving farther into the visor main body 2 than it is supposed to when the second shaft end 3c is mounted onto the second mounting part 5.

Figure 8:
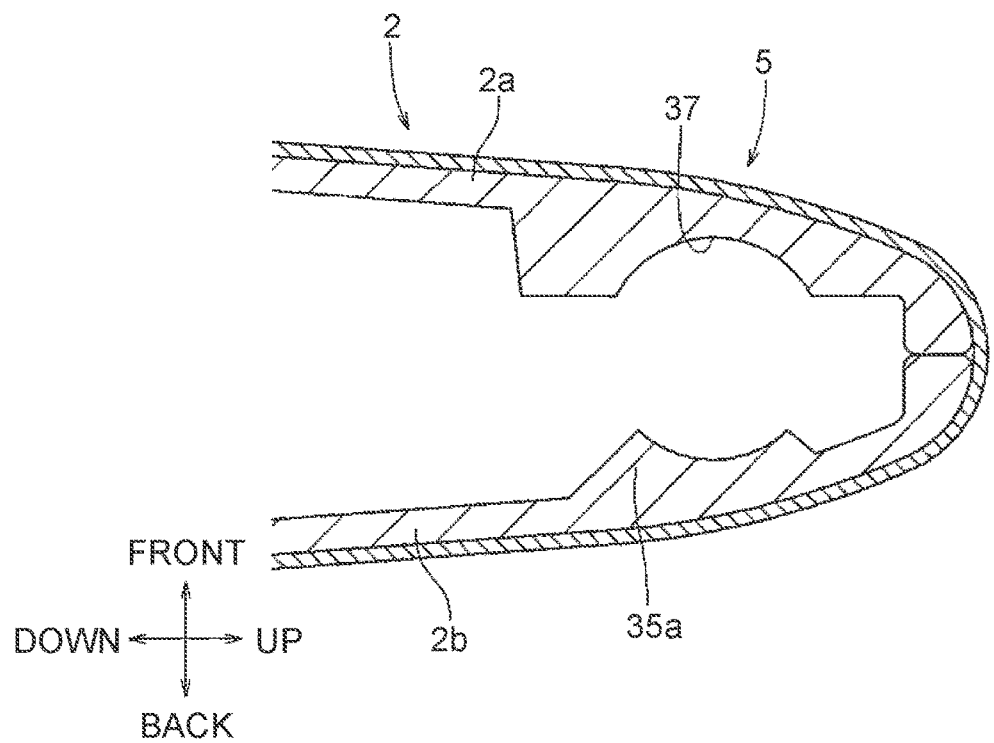
FIG. 8 is a view of section along VIII-VIII in FIG. 4 as seen from the arrow direction.

As shown in FIG. 3 and FIG. 8, the second mounting part 5 has the deep-side flat part 35 on the deep side of the first inlet protrusion 31, and a deep-side recess 37 between the second stopper 33 and the second inlet protrusion 32. The deep-side flat part 35 has a leading-end protrusion 35a adjacent to the first inlet protrusion 31. The leading-end protrusion 35a is shorter in height than the first inlet protrusion 31, and the deep-side flat part 35 is as a whole shorter in height than the first inlet protrusion 31. As shown in FIG. 3 and FIG. 8, the deep-side recess 37 is located between the second stopper 33 and the second inlet protrusion 32. This prevents a force exerted on the second stopper 33 from being transmitted to the second inlet protrusion 32.

As shown in FIG. 3 and FIG. 4, the first mounting part 4 has an inlet opening diameter (R1+R3) in a free state that is determined by the inlet protrusion 21 and the inlet recess 22, and a deep-side opening diameter (R1+R2+R7) in a free state that is determined by the deep-side protrusion 23 and the deep-side flat part 24. Further, the first mounting part 4 has an oblique inlet opening diameter R6 that is determined by the inlet protrusion 21 and a left-side leading end of the deep-side protrusion 23. The oblique inlet opening diameter R6 is larger than the diameter r2 of the first shaft end 3b. These diameters have a relation of (R1+R2)≤r2. Therefore, when the first shaft end 3b is held parallel to the first mounting part 4 as shown in FIG. 6, the first mounting part 4 does not deform or deforms a little. The first shaft end 3b can be supported without a clearance in the radial direction by the inlet protrusion 21 and the deep-side protrusion 23 working together. Thus, the shaft 3 is less likely to rattle in the radial direction relatively to the first mounting part 4.

As shown in FIG. 3, the second mounting part 5 has an inlet opening diameter (R4+R5) that is determined by the first inlet protrusion 31 and the second inlet protrusion 32. The inlet opening diameter (R4+R5) is smaller than the diameter r2 of the second shaft end 3c in a free state. Therefore, when the second shaft end 3c is inserted into the second mounting part 5, the second mounting part 5 deforms a little. Accordingly, the second shaft end 3c can be supported without a clearance. Thus, the shaft 3 is less likely to rattle in the radial direction relatively to the second mounting part 5.

Next, a procedure of mounting the shaft 3 onto the visor main body 2 will be described. First, the first shaft end 3b is obliquely inserted into the first mounting part 4 as shown in FIG. 5. Specifically, the first shaft end 3b is obliquely (in the direction of arrow A) inserted into the first mounting part 4, from the inlet recess 22 toward the deep-side flat part 24. Since the inlet recess 22 is provided as shown in FIG. 4 and FIG. 5, the inlet opening diameter (R1+R3) is larger than the diameter r2 of the first shaft end 3b. Since the deep-side flat part 24 is provided, the deep-side opening diameter (R1+R2+R7) is larger than the diameter r2 of the first shaft end 3b. Thus, the first shaft end 3b can be obliquely inserted into the first mounting part 4 without the first mounting part 4 and the first shaft end 3b being elastically deformed. Therefore, the first shaft end 3b can be inserted into the first mounting part 4 with a small force.

As shown in FIG. 5, the terminal portion 3f of the first shaft end 3b comes into contact with the perpendicular surface 25a of the first stopper 25. Thus, the shaft 3 is prevented from being inserted deep into the visor main body 2 beyond the first stopper 25. As shown in FIG. 6, the shaft 3 is tilted around a point near the inlet 20 of the first mounting part 4 so as to be parallel to the first mounting part 4. As shown in FIG. 4, (R1+R2) in a free state is equal to or a little smaller than the diameter r2 of the first shaft end 3b. Therefore, the first shaft end 3b is supported without a clearance in the radial direction by the inlet protrusion 21 and the deep-side protrusion 23 working together. When (R1+R2) is smaller than r2, the shaft 3, which is solid, does not deform and the visor main body 2 deforms. Since the visor main body 2 has a large volume compared with the shaft 3, the visor main body 2 is less likely to be subjected to stress concentration than the shaft 3.

Next, the shaft 3 is slid in the longitudinal direction (the direction of arrow B), parallel to the central axis C of the shaft 3, from the position of FIG. 6 to the position of FIG. 3. As shown in FIG. 3, the terminal portion 3g of the second shaft end 3c comes into contact with a right end surface 33a of the second stopper 33. Thus, the shaft 3 is prevented from being inserted deep into the visor main body 2 beyond the second stopper 33. The inlet opening diameter (R4+R5) of the second mounting part 5 is a little smaller than the diameter r2 of the second shaft end 3c (R4+R5<r2) in a free state. Therefore, the second shaft end 3c is supported by the first inlet protrusion 31 and the second inlet protrusion 32 from both sides in the radial direction. Further, the leading end of the second inlet protrusion 32 fits into the second groove 3e of the second shaft end 3c. Thus, the shaft 3 is prevented from sliding relatively to the visor main body 2.

As described above and shown in FIG. 2 and FIG. 3, the vehicle sun visor 1 has the visor main body 2 having a plate shape and having the recess 2c formed at one edge and the shaft 3 located in the recess 2c. The vehicle sun visor 1 further has the first mounting part 4 of the visor main body 2 into which the first shaft end 3b of the shaft 3 is inserted, and the second mounting part 5 of the visor main body 2 into which the second shaft end 3c of the shaft 3 is inserted. The first mounting part 4 has the inlet 20 through which the first shaft end 3b is inserted, and the inlet protrusion 21 that protrudes at the inlet 20 toward the first shaft end 3b. The first mounting part 4 further has the inlet recess 22 that is located at the inlet 20 at a position that is radially opposite to the inlet protrusion 21, and separated from the first shaft end 3b, and the deep-side protrusion 23 that extends from the inlet recess 22 toward the deep side along the first shaft end 3b and protrudes toward the first shaft end 3b. The first mounting part 4 further has the deep-side flat part 24 that is located at a position that is radially opposite to the deep-side protrusion 23 and extends farther toward the deep side than the inlet protrusion 21, and the first stopper 25 that is located at a position farther on the deep side than the deep-side protrusion 23 and protrudes from the visor main body 2 so as to face the leading end, in the longitudinal axis direction, of the first shaft end 3b. The second mounting part 5 has the inlet 30 through which the second shaft end 3c is inserted, and the first inlet protrusion 31 that protrudes at the inlet 30 toward the second shaft end 3c. The second mounting part 5 further has the second inlet protrusion 32 that protrudes at the inlet 30 from a position that is radially opposite to the first inlet protrusion 31 toward the second shaft end 3c, and the second stopper 33 that is located at a position farther on the deep side than the second inlet protrusion 32 and protrudes from the visor main body 2 so as to face the leading end, in the longitudinal axis direction, of the second shaft end 3c.

Thus, the inlet recess 22 is formed in the first mounting part 4, which allows the first shaft end 3b to be obliquely inserted into the first mounting part 4 as shown in FIG. 5. Specifically, the first shaft end 3b can be inserted from the side of the inlet recess 22 toward the deep-side flat part 24 located on the deep side of the inlet protrusion 21. Therefore, the first shaft end 3b can be inserted into the first mounting part 4, for example, without the first shaft end 3b and the first mounting part 4 being deformed. After the first shaft end 3b is obliquely inserted into the first mounting part 4, the first shaft end 3b is held parallel to the first mounting part 4 as shown in FIG. 6. Thus, the first shaft end 3b is supported by the inlet protrusion 21 and the deep-side protrusion 23 from both sides in the radial direction. Then, the shaft 3 is slid in the longitudinal direction (the direction of arrow B) to insert the second shaft end 3c into the second mounting part 5 as shown in FIG. 3. Thus, the second shaft end 3c is supported by the first inlet protrusion 31 and the second inlet protrusion 32 from both sides in the radial direction. Movement of the shaft 3 in the longitudinal direction is restricted by the first stopper 25 and the second stopper 33. Therefore, when the shaft 3 is mounted onto the visor main body 2, the shaft 3 is less likely to move farther into the visor main body 2 than it is supposed to. Thus, the shaft 3 can be reliably mounted onto the visor main body 2.

As shown in FIG. 4, the first mounting part 4 has the inlet opening diameter (R1+R3) that is determined by the inlet recess 22 and the inlet protrusion 21, and the deep-side opening diameter (R1+R2+R7) that is determined by the deep-side protrusion 23 and the deep-side flat part 24. The inlet opening diameter and the deep-side opening diameter are large enough to allow the first shaft end 3b to be obliquely (in the direction of arrow A) inserted into the first mounting part 4, from the side of the inlet recess 22 toward the deep-side flat part 24 as shown in FIG. 5, without the first mounting part 4 and the first shaft end 3b being elastically deformed. This means that there is no structure in the insertion path for the first shaft end 3b.

Thus, obliquely inserting the first shaft end 3b into the first mounting part 4 as shown in FIG. 5 does not require the force to elastically deform the first mounting part 4 or the first shaft end 3b. Therefore, the first shaft end 3b can be inserted into the first mounting part 4 with a small force. If the first mounting part 4 or the first shaft end 3b is significantly elastically deformed, the first mounting part 4 or the first shaft end 3b will undergo plastic deformation or become prone to deformation over time. The above-described feature can reduce the likelihood of this phenomenon. As a result, the likelihood that the shaft 3 may rattle relatively to the visor main body 2 due to plastic deformation of the first mounting part 4 or the first shaft end 3b can be reduced. Moreover, the durability of the visor main body 2 and the shaft 3 can be enhanced.

The shaft 3 has such a length in the longitudinal direction that the second shaft end 3c is detached from the second mounting part 5 in the longitudinal axis direction when the shaft 3 is located in a first limit position in which it contacts the first stopper 25 as shown in FIG. 5. Further, the inlet recess 22 of the first mounting part 4 is formed such that the shaft 3 tilts around the first mounting part 4 in the first limit position and that the second shaft end 3c is detached from the second mounting part 5 in the radial direction orthogonal to the longitudinal axis direction.

Thus, when the first shaft end 3b is inserted into the first mounting part 4 as shown in FIG. 5, the first shaft end 3b can be obliquely inserted into the first mounting part 4, without being interfered with by the second mounting part 5. Then, the shaft 3 can be held parallel to the first mounting part 4 as shown in FIG. 6 while the first shaft end 3b is inserted toward the deep side of the first mounting part 4. Thereafter, sliding the shaft 3 in the longitudinal direction (the direction of arrow B) can insert the second shaft end 3c into the second mounting part 5 as shown in FIG. 3. In this way, the shaft 3 can be easily mounted onto the visor main body 2.

As shown in FIG. 3 and FIG. 6, the shaft 3 is slidable in the longitudinal axis direction between the first limit position in which it contacts the first stopper 25 and a second limit position in which it contacts the second stopper 33. Further, the deep-side protrusion 23 of the first mounting part 4 has such a length in the longitudinal axis direction that the deep-side protrusion 23 contacts the first shaft end 3b so as to support the first shaft end 3b in any position between the first limit position in which the shaft 3 contacts the first stopper 25 and the second limit position in which the shaft 3 contacts the second stopper 33.

Thus, the deep-side protrusion 23 of the first mounting part 4 supports the first shaft end 3b as shown in FIG. 3 and FIG. 6, so that the shaft 3 can be slid without tilting relatively to the first mounting part 4. Therefore, the shaft 3 can be easily mounted onto the visor main body 2.

As shown in FIG. 3 and FIG. 4, the second mounting part 5 has the inlet opening diameter (R4+R5) that is determined by the first inlet protrusion 31 and the second inlet protrusion 32. The inlet opening diameter (R4+R5) is smaller than the diameter r2 of the second shaft end 3c in a free state. Therefore, when the second shaft end 3c is inserted into the second mounting part 5, the second mounting part 5 deforms a little. The second shaft end 3c can be supported without a clearance by the first inlet protrusion 31 and the second inlet protrusion 32. Thus, the shaft 3 is less likely to rattle in the radial direction relatively to the second mounting part 5.

As shown in FIG. 3 and FIG. 4, the radial width (R1+R2) of the first mounting part 4 in a free state that is determined by the inlet protrusion 21 and the deep-side protrusion 23 is equal to or smaller than the diameter r2 of the first shaft end 3b. Therefore, when the first shaft end 3b is obliquely inserted into the first mounting part 4 as shown in FIG. 5 and then the first shaft end 3b is held parallel to the first mounting part 4 as shown in FIG. 6, the first mounting part 4 does not deform or deforms a little. The first shaft end 3b can be supported without a clearance in the radial direction by the inlet protrusion 21 and the deep-side protrusion 23 working together. Thus, the shaft 3 is less likely to rattle in the radial direction relatively to the first mounting part 4.

As shown in FIG. 3 and FIG. 4, the shaft 3 has the first groove 3d formed at the first shaft end 3b and the second groove 3e formed at the second shaft end 3c. At least one of the first inlet protrusion 31 and the second inlet protrusion 32 of the second mounting part 5 is fitted into the second groove 3e. Thus, movement of the shaft 3 in the longitudinal direction is restricted by the first inlet protrusion 31 or the second inlet protrusion 32 that is fitted into the second groove 3e.

The present invention is not limited to the external appearance and the configuration described in the above embodiment, and various changes, additions, and omissions can be made within such a range that does not change the scope of the device of the invention. For example, the visor main body 2 has the recess 2c on the left side of the upper edge in the deployed position as shown in FIG. 2. Instead of this, the visor main body 2 may have the recess 2c at the center of the upper edge or on the right side of the upper edge.

The shaft 3 has the first shaft end 3b and the second shaft end 3c that have a smaller diameter than that of the large-diameter part 3a as shown in FIG. 3. Instead of this, the shaft 3 may have a first shaft end 3b and a second shaft end 3c that have the same diameter as or a larger diameter than that of the large-diameter part 3a.

The visor main body 2 has the first mounting part 4 on the right side of the recess 2c and the second mounting part 5 on the left side of the recess 2c as shown in FIG. 2 and FIG. 3. Instead of this, the visor main body 2 may have the first mounting part 4 on the left side of the recess 2c and the second mounting part 5 on the right side of the recess 2c.

The inlet protrusion 21 of the first mounting part 4 has a leading end that has a larger width than the width of the first groove 3d of the first shaft end 3b as shown in FIG. 3. Instead of this, the inlet protrusion 21 may have a leading end that has the same width as or a smaller width than the width of the first groove 3d.

The first stopper 25 has a substantially right-angled triangular prism shape when seen from below as shown in FIG. 3. Instead of this, the first stopper 25 may have a rectangular shape or a plate shape when seen from below. The first stopper 25 protrudes from the first shell 2a toward the second shell 2b. Instead of this, the first stopper 25 may protrude from the second shell 2b toward the first shell 2a.

The first inlet protrusion 31 of the second mounting part 5 has a leading end that has a larger width than the width of the second groove 3e of the second shaft end 3c as shown in FIG. 3. Instead of this, the inlet protrusion 31 may have a leading end that has the same width as or a smaller width than the width of the second groove 3e.

The second stopper 33 has a substantially plate shape as shown in FIG. 3 and FIG. 7. Instead of this, the second stopper 33 may have a columnar shape or a shape similar to the shape of the first stopper 25. The second stopper 33 protrudes from the first shell 2a toward the second shell 2b. Instead of this, the second stopper 33 may protrude from the second shell 2b toward the first shell 2a.

In the deployed state shown in FIG. 1, the visor main body 2 has the first shell 2a on the side of the vehicle cabin and the second shell 2b on the side of the windshield 41 as shown in FIG. 2 and FIG. 3. Instead of this, the visor main body 2 may have the second shell 2b on the side of the vehicle cabin and the first shell 2a on the side of the windshield 41.

REFERENCE SIGNS LIST

1 VEHICLE SUN VISOR
2 VISOR MAIN BODY
2a FIRST SHELL
2b SECOND SHELL
2c RECESS
3 SHAFT
3b FIRST SHAFT END
3c SECOND SHAFT END
4 FIRST MOUNTING PART
5 SECOND MOUNTING PART
20 INLET
21 INLET PROTRUSION
22 INLET RECESS
23 DEEP-SIDE PROTRUSION
24 DEEP-SIDE FLAT PART
25 FIRST STOPPER
30 INLET
31 FIRST INLET PROTRUSION
32 SECOND INLET PROTRUSION
33 SECOND STOPPER

What is claimed is:
1. A vehicle sun visor comprising:
a visor main body having a plate shape and having a recess formed at one edge;
a shaft located in the recess;
a first mounting part of the visor main body into which a first shaft end of the shaft is inserted; and
a second mounting part of the visor main body into which a second shaft end of the shaft is inserted,
wherein the first mounting part has an inlet through which the first shaft end is inserted; an inlet protrusion that protrudes at the inlet toward the first shaft end; an inlet recess that is located at the inlet at a position that is radially opposite to the inlet protrusion, the inlet recess being separated from the first shaft end; a deep-side protrusion that extends from the inlet recess toward a deep side along the first shaft end and protrudes toward the first shaft end; a deep-side flat part that is located at a position that is radially opposite to the deep-side protrusion and extends farther toward the deep side than the inlet protrusion; and a first stopper that is located at a position farther on the deep side than the deep-side protrusion and protrudes from the visor main body so as to face a leading end, in a longitudinal axis direction, of the first shaft end, and
wherein the second mounting part has an inlet through which the second shaft end is inserted; a first inlet protrusion that protrudes at the inlet toward the second shaft end; a second inlet protrusion that protrudes at the inlet from a position that is radially opposite to the first inlet protrusion toward the second shaft end; and a second stopper that is located at a position farther on a deep side than the second inlet protrusion and protrudes from the visor main body so as to face a leading end, in a longitudinal axis direction, of the second shaft end.
2. The vehicle sun visor according to claim 1, wherein:
the first mounting part has an inlet opening diameter that is determined by the inlet recess and the inlet protrusion, and a deep-side opening diameter that is determined by the deep-side protrusion and the deep-side flat part; and the inlet opening diameter and the deep-side opening diameter are large enough to allow the first shaft end to be obliquely inserted into the first mounting part, from a side of the inlet recess toward the deep-side flat part, without the first mounting part and the first shaft end being elastically deformed.

3. The vehicle sun visor according to claim 2, wherein:

the shaft has such a length in a longitudinal direction that the second shaft end is detached from the second mounting part in the longitudinal axis direction when the shaft is located in a first limit position in which the shaft contacts the first stopper; and the inlet recess of the first mounting part is formed such that the shaft tilts around the first mounting part in the first limit position and that the second shaft end is detached from the second mounting part in a radial direction orthogonal to the longitudinal axis direction.

4. The vehicle sun visor according to claim 1, wherein:

the shaft is slidable in the longitudinal axis direction between a first limit position in which the shaft contacts the first stopper and a second limit position in which the shaft contacts the second stopper; and the deep-side protrusion of the first mounting part has such a length in the longitudinal axis direction that the deep-side protrusion contacts the first shaft end so as to support the first shaft end in any position between the first limit position in which the shaft contacts the first stopper and the second limit position in which the shaft contacts the second stopper.

* * * * *